US010850416B2

(12) United States Patent
Schmeiser et al.

(10) Patent No.: US 10,850,416 B2
(45) Date of Patent: Dec. 1, 2020

(54) APPARATUS AND METHOD FOR SLICING FOOD PRODUCTS

(71) Applicant: Textor Maschinenbau GmbH, Wolfertschwenden (DE)

(72) Inventors: Jörg Schmeiser, Wiggensbach (DE); Josef Mayer, Memmingerberg (DE)

(73) Assignee: Textor Maschinenbau GmbH (DE)

( * ) Notice: Subject to any disclaimer, the term of this patent is extended or adjusted under 35 U.S.C. 154(b) by 504 days.

(21) Appl. No.: 15/332,253

(22) Filed: Oct. 24, 2016

(65) Prior Publication Data

US 2017/0113368 A1 Apr. 27, 2017

(30) Foreign Application Priority Data

Oct. 26, 2015 (DE) .......................... 10 2015 118 202

(51) Int. Cl.
*B26D 3/28* (2006.01)
*B26D 7/06* (2006.01)
*B26D 7/01* (2006.01)
*B65G 47/82* (2006.01)

(52) U.S. Cl.
CPC .............. *B26D 3/28* (2013.01); *B26D 7/01* (2013.01); *B26D 7/0608* (2013.01); *B26D 7/0625* (2013.01); *B26D 7/0633* (2013.01); *B26D 7/0683* (2013.01); *B26D 2210/02* (2013.01); *B65G 47/82* (2013.01)

(58) Field of Classification Search
CPC .......... B26D 3/28; B26D 7/01; B26D 7/0608; B26D 7/0625; B26D 7/0633; B26D 7/0683; B26D 2210/02; B65G 47/82
See application file for complete search history.

(56) References Cited

U.S. PATENT DOCUMENTS

| 2,118,531 | A |   | 5/1938  | Van Veen                  |
|-----------|---|---|---------|---------------------------|
| 3,708,055 | A | * | 1/1973  | Miller ........... B65G 47/681 |
|           |   |   |         | 198/357                   |
| 9,061,432 | B2| * | 6/2015  | Reifenhaeuser ..... B26D 7/02 |
| 2006/0219069 | A1 | * | 10/2006 | Skaar ............. B26D 7/0683 |
|           |   |   |         | 83/13                     |

(Continued)

FOREIGN PATENT DOCUMENTS

AT       513260 A4   3/2014
DE     69502687 T2   2/1999

(Continued)

OTHER PUBLICATIONS

German Patent Office Research Report dated Sep. 9, 2016 for German Patent Application No. 102015118202.5, 2 pages.

*Primary Examiner* — Omar Flores Sanchez
(74) *Attorney, Agent, or Firm* — Dickinson Wright PLLC

(57) ABSTRACT

The invention relates to an apparatus for slicing food products, in particular to high-performance slicers, having a cutting region at whose end a cutting blade moves, in particular in a rotating and/or revolving manner, in a cutting plane, and having a transport device which transports products to be sliced in a direction of transport over one track or multiple tracks to the cutting region, with the transport device comprising a plurality of positioners for the products in the or each transport track driven simultaneously in the direction of transport and arranged spaced apart from one another in the direction of transport.

34 Claims, 4 Drawing Sheets

(56) References Cited

U.S. PATENT DOCUMENTS

Figure 1:
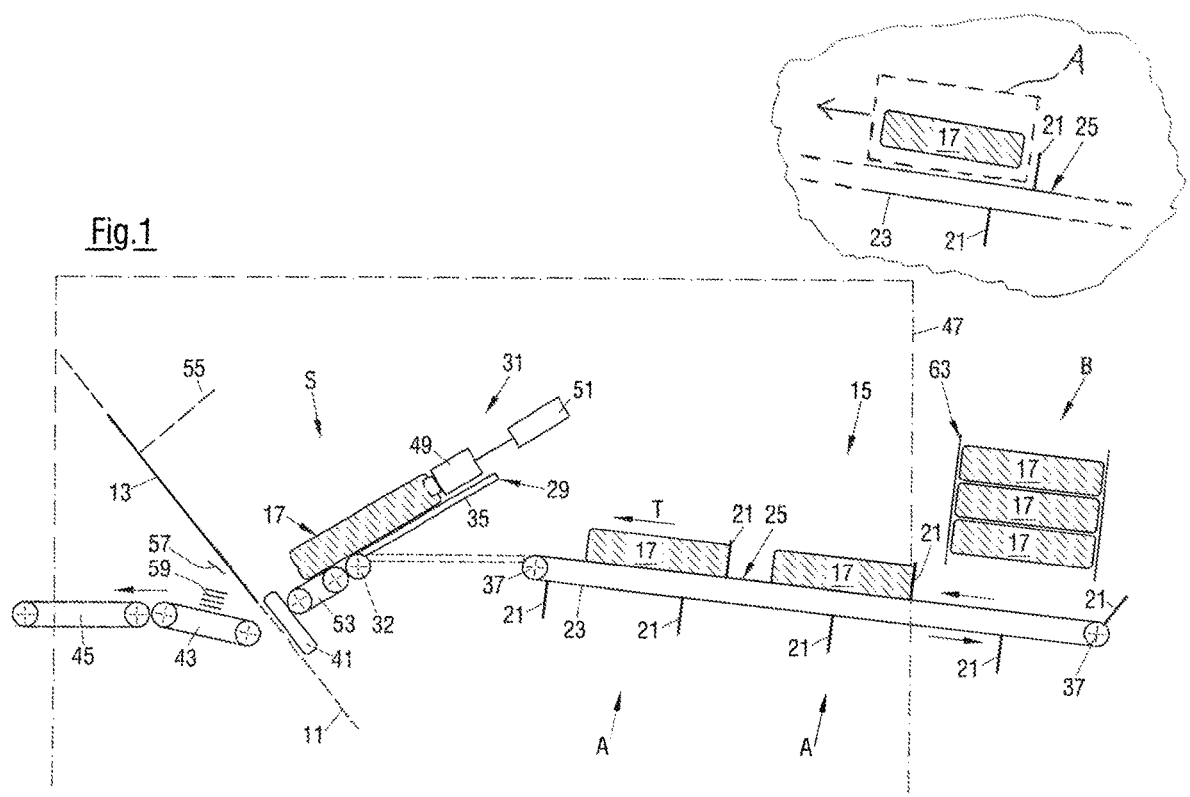

| | | |
|---|---|---|
| 2007/0193425 A1 | 8/2007 | Weber |
| 2011/0265624 A1* | 11/2011 | Pasek ..................... B26D 7/225 83/409 |
| 2012/0073415 A1* | 3/2012 | Maidel ................... B26D 1/143 83/13 |
| 2015/0237874 A1 | 8/2015 | Haas et al. |
| 2016/0271822 A1* | 9/2016 | Burk ........................ B26D 5/00 |
| 2017/0259448 A1* | 9/2017 | Weber .................. B26D 7/0625 |

FOREIGN PATENT DOCUMENTS

| | | |
|---|---|---|
| DE | 102006007490 A1 | 8/2006 |
| DE | 202010003290 U1 | 7/2010 |
| DE | 102013207401 A1 | 10/2014 |
| GB | 505821 A | 5/1939 |

* cited by examiner

APPARATUS AND METHOD FOR SLICING FOOD PRODUCTS

The invention relates to an apparatus for slicing food products, in particular to a high-performance slicer, having a cutting region at whose end a cutting blade movers, in particular in a rotating and/or revolving manner, in a cutting plane, and having a transport device which transports products to be sliced in a direction of transport over one track or multiple tracks to a cutting region. The invention furthermore relates to slicing methods.

Food products present in the form of so-called bars or loaves such as sausage, cheese or meet, can be sliced at a high speed using modern high-performance slicing machines which will also simply be called slicers in the following. Between several hundred and some thousand slices per minute can in particular be cut off from a product in dependence on the type of cutting blade used.

Multi-track slicers in which a plurality of products disposed next to one another in parallel tracks are simultaneously supplied to a cutting blade and are sliced are above all increasingly being used to increase product throughput. The individual tracks can be operated independently of one another in part or in full both at the supply side and in units which adjoin the cutting blade and which in particular serve for portion forming.

A stream of individual slices or pieces or of slices combined into portions which is as continuous as possible in the direction of a packaging machine located at the end of a production line is aimed for independently of whether a slicer is configured as single-track or multi-track. A stream of slices or portions which is as continuous as possible with a minimal number of gaps and with gaps which are as small as possible is of advantage for the units connected downstream of the slicer, in particular the ones for forming formats and for buffering as well as for placing into a package or for transfer to the packaging machine.

The transport of the products to be sliced into the slicers and within the slicer to the cutting blade, which is also called the product supply in the region disposed directly before the cutting blade, that is in the cutting region in the terminology used here, has great importance in slicing operation, and indeed in particular with respect to the achievable product throughput and to the optimization of the above-mentioned units connected downstream for forming formats, for buffering and for transfer to a packaging machine.

The product transport is typically divided into the following regions: The transport device is loaded over one track or multiple tracks with the products to be sliced in a loading region. This can generally take place automatically, but with a manual loading by one or more operators who place the products to be sliced onto the transport device by hand still being usual in practice.

The transport line which leads into the actual slicer or into its machine housing adjoins the loading region. Depending on the product or on the specific design of the slicer, different worksteps can be carried out on the transport line which are required for the respective cutting application. The products can in particular be weighed and scanned to obtain the product weight and information on the outer contour and, optionally, also on the inner structure of each product. These product data are provided by a central control device of the slicer to the product supply connected directly upstream of the cutting blade in the cutting region. The product supply can then be operated on the basis of these product data such that, for example, portions of constant weight comprising a plurality of individual slices are produced. Specific worksteps during the product transport into the slicer or during the product transport taking place within the machine housing can, however, also be necessary for a slicing operation without portioning, i.e. for the pure cutting of slices or pieces.

The product transport typically takes place by means of revolving continuous belts onto which the products are placed during loading and on which the products lie during the transport.

An important interface is the transition from the transport device into the product supply disposed in front of the cutting blade which belongs to the cutting region within the framework of the terminology used here. Whereas the product transport starting in the loading region usually runs substantially horizontally in practice, the supply of the products in the cutting region, that is into the cutting plane, typically takes place in a plane extending obliquely downwardly, e.g. inclined by approximately 40 to 45° to the horizontal. The product supply is mostly configured as pivotable for this purpose and is provided with a so-called rocker to move the products transported in to a higher level and into the oblique position required for slicing.

Such supply rockers typically already take over the products from the transport device at the input side in the region of the inlet into the machine housing so that the products can be transferred to the supply rocker by means of the transport belts.

It is now significant for practice that an unavoidable time loss is associated with the pivoting upward of the products which not only brings about a reduction of the product throughput, which generally has to be accepted, due to the forced breaks in slicing associated therewith, but also results in gaps and irregularities in the outgoing stream of slices or portions which are in particular caused by the type of products, i.e. the products themselves can also be detrimental to an optimum operation of the slicer and of the devices connected downstream of the cutting blade.

This is above all the case on the slicing of comparatively short natural products whose lengths can very relatively greatly such as ham, that is e.g. during so-called bacon slicing, Such products have the consequence—due to their small lengths—of a relatively large number of forced breaks which moreover occur irregularly—due to the varying product length. This distribution of the forced breaks which is more or less random in a time respect has retroactive effects up to and into the loading region. Since the transport device can only be loaded in the comparatively short standstill phases of the transport belt, this requires a high degree of permanent attention on the part of the operator who has to watch out for these standstill phases and then in each case has to load a comparatively heavy product within the relatively short time available. This produces high stress on the operator which becomes even greater as the number of tracks of the slicing apparatus increases.

The time relationships will be illustrated briefly in the following for the example of bacon slicing.

A ham of an average length of e.g. 750 mm is typically sliced within approximately 5 seconds when the slices are not portioned. The product supply likewise requires approximately 5 seconds to be ready for the following product again, which means a time duration of approximately 10 seconds per product and thus a throughput of approximately six products per minute for each track. With a two-track slicer, for example, an operator consequently has to load twelve products having an individual weight of typically approximately 5 kilograms per minute. A time window of approximately 3 seconds is available for each of these loading procedures during which the transport belt is at a standstill so that a product can be pivoted from the above-mentioned supply rocker into the oblique position required for cutting.

Due to the varying lengths of the products, the loader can, however, not rely on standstill phases occurring at regular time intervals. The transport time of approximately 7 seconds on average to be waited between the standstill phases is actually shorter or longer—in dependence on the product length—which requires the permanently high attention of the operator.

The above-mentioned slicing time of approximately 5 seconds applies to a cutting without portioning and typically amounts to approximately 15 seconds when portions are to be produced. The waiting time between the standstill phases is extended to approximately 17 seconds on average with a portioning slicing. In this operating mode, the products admittedly have to be loaded less frequently by the operator. The attention span between two loading procedures required from the operator is, however, much larger in this operating mode.

The disadvantages of previous transport devices are, however, not only restricted to effects on the loading region. The products can also slide on the transport belts typically used. The positions of the products on the transport line are consequently not known with sufficient precision so that in principle the position of each product has to be detected separately for each of the above-mentioned additional work-steps along the transport line and for the transfer of the products to the product supply. In addition, in multi-track operation, a common transport belt is typically used for all the tracks and the transfer to the product supply mostly takes place using a common rocker.

In multi-track slicing of comparatively short natural products which vary by a relatively great amount in length, said natural products are therefore not only arranged irregularly with respect to the position of the product starts and the product ends within each track, but there is also no correlation between the tracks in this respect. A common transport and a common transfer to the product supply disposed in front of the cutting blade thus result in a high degree of irregularity and incompleteness in the arrangement of the products in front of the cutting blade or in the arrangement of the slices or portions produced by means of the cutting blade. This in turn requires a high mechanical and technical control effort either at the supply side or for the devices connected downstream of the cutting blade in order ultimately to form exact formats of slices or portions which are absolutely necessary for the packaging machine located at the end of the production line.

It is therefore an object of the invention to eliminate the above-mentioned disadvantages and to optimize the slicing of food products with as little construction effort and technical control effort as possible, with in particular the loading of the transport device being simplified, the position accuracy of the products during the transport being improved and a stream of slices or portions being achieved which is as regular as possible without large gaps for the devices arranged downstream of the cutting blade.

This object is satisfied by the respective features of the independent claims.

Provision is in particular made in the apparatus in accordance with the invention that the transport device comprises a plurality of positioners for the products driven simultaneously in the direction of transport and arranged spaced apart from one another in the direction of transport in the or each transport track.

The positioners allow a clearly defined positioning of the products both on the loading and during transport. The position of every single product on the transport device is known at every time and can be immovably stable with a corresponding design of the positioners if the positioners prevent a sliding of the products and thus a change of the product position in the direction of transport.

The position accuracy achieved by the invention improves and simplifies the operation of the apparatus. Where the individual products are to be positioned on the transport device is clearly defined for the loading region. In addition, the positioners can simplify an automated loading with a corresponding configuration. In addition, work units provided along the transport line such as a scale or a scanner as well as a transfer unit at the transition to the cutting region do not respectively have to determine the product position themselves.

These advantages are present independently of whether the slicing apparatus is operated over one track or a plurality of tracks. The position accuracy achieved by the positioners in accordance with the invention is furthermore in principle also given when the spacings between the positioners are of different sizes. The invention is nevertheless particularly advantageous in an embodiment in which the positioners are evenly spaced apart in the or each track. Such a "uniform compartmentalization" of the transport device allows an advantageous, cyclic transport operation which will be looked at in more detail in the following.

The position accuracy of the products in accordance with the invention is furthermore present independently of whether the positioners, with a corresponding configuration, effect the advance of the products over the total transport line or e.g. only represent an active product advance at the start during loading and subsequently primarily satisfy the function of an abutment or positioning. The advantages of the product positioning in accordance with the invention are therefore in particular given independently of whether the products are e.g. pushed along the total transport line over a stationary product support by means of the correspondingly configured positioners or of whether the products lie on a product support which moves together with the positioners, so-to-say "rides along", during the transport.

The advantages in accordance with the invention are furthermore present independently of how the transport device is specifically configured and operated. When the positioners are attached, for example, to a common elongated drive member which is e.g. provided in the form of a revolving continuous member, the positioners provide an exact positioning of the products e.g. independently of whether the products lie on this drive member, for example a chain, itself or whether the drive member extends beneath or to the side of a stationary product support.

The positioners can each form or define the rear end of a product compartment, with this not being compulsory, however.

Provision can furthermore be made that the positioners each form or comprise an entrainer which is configured to entrain the product during the transport, in particular to act on the rear product end. The actual advance of the products in the direction of transport can therefore take place by the positions then configured as entrainers, with this not being compulsory, however. The products can e.g. so-to-say be supported by a product support "riding along"—instead of only being pushed—so that the positioners do not have to have any entrainment function.

It also becomes clear against the background of the above statements that the term "product compartment" is to be understood broadly and is in particular not necessarily to be understood in the sense of a recess provided for a respective product. A product compartment generally designates a section of the transport device which is provided for exactly one product and whose rear end is e.g. defined by the respective positioner.

As already mentioned above, the cutting region not only comprises the cutting blade moving in the cutting plane and a cutting edge which is optionally provided and which cooperates with the cutting blade. The cutting region can additionally comprise a product supply which supplies the products directly over one track or multiple tracks to the cutting blade and which, for example, comprises one or more product holders or product grippers such as are generally known to the skilled person.

Although it is in principle possible that the transport device in accordance with the invention supplies the products directly to the cutting blade, a separate product supply is consequently not compulsory, such a product supply is provided in a preferred embodiment to which the products consequently have to be transferred from the transport device or which takes over the products from the transport device. A takeover device which is optionally provided for this purpose will be explained in more detail in the following.

Further possible embodiments of the invention will be explained in more detail in the following and are also set forth in the dependent claims and in the drawings.

As already mentioned above, the positioners are preferably evenly spaced apart in the direction of transport. This allows a particularly advantageous cyclic transport operation. The transport device is in particular configured for a cyclic transport operation having continuously consecutive transport cycles. The transport cycles respectively comprise a movement phase with product compartments moving in the direction of transport and a waiting phase with stationary product compartments. In applications relevant to practice such as e.g. explained above with reference to bacon slicing, a quasi-continuous product transport hereby results so-to-say with waiting phases which are each considerably shorter than the movement phases. In the perception of an operator in the loading region, the transport device moves continuously. In addition, the standstill phases of the transport device used for loading occur due to the cycling in strict temporal regularity, which "stresses" the operator much less during manual loading and, in the case of an automatic loader, simplifies its configuration.

In addition, a cyclic transport operation in conjunction with the position accuracy of the products given in accordance with the invention has the advantage that one or more workstations for the products can be arranged along the transport line and their operation can in each case be coordinated with the cycling of the transport device. A workstation for which a stationary product is of advantage such as a weighing station can respectively be active in the waiting phase. Other workstations for which a moving product is actually advantageous can respectively be active in the movement phase. Such a workstation can in particular comprise a product scanner for determining the outer product contour and/or the inner product structure. Depending on the "treatment" a product undergoes at a workstation, the product can either remain on the transport device or the product is temporarily taken over by the workstation, for example by a temporary raising or lifting of the product.

The transport device can e.g. move the products or the product compartments through the work station. The workstation can be stationary in this respect. Alternatively, the workstation can be temporarily movable along with the product compartments, i.e. an "on-the-fly" treatment (e.g. weighing or scanning) of the products can take place so-to-say. Waiting phases or standstill times can hereby be avoided.

A workstation is preferably configured to weigh the products at the transport device.

Provision is preferably made that the products are respectively decoupled from the positioner or from the transport device at a workstation, e.g. by raising or lifting. Alternatively or additionally, a relatively slight forward movement can be provided for the products at the workstation so that the product can come free from the positioner or the entrainer. Such an avoidance of disturbing influences on the products is in particular advantageous when the products are weighed at the workstation.

Provision is made in accordance with an embodiment that the transport device and/or the workstation is/are configured respectively to temporarily raise the products in the region of the workstation, to bring them out of engagement with the positioner and/or to space them apart from the positioner, in particular by a combined lift and forward movement for the products.

It can additionally be achieved by the cycling of the transport device that—with respect to the consecutive products—the gaps are less large and the irregularities are reduced or completely eliminated in the outgoing stream of slices or portions produced by the slicing. This is particularly advantageous in a multi-track operation over individual tracks having tracks which are operable completely independently at the supply side, and indeed in particular when the tracks differ by a relatively large amount from one another with respect to length and arrangement of the products since with operation over individual tracks the one track does not have to wait for the other track.

The transport device can be configured for cyclic transport movements in accordance with a mode of operation, wherein, in the transport cycles in each case, the product is raised, a forward movement with the product is carried out, the product is lowered and a rearward movement is carried out without the product. Such a step-wise forward movement of the products can take place with or without a product support. The products can in this respect be moved from product compartment to product compartment or in each case together with at least one component forming or defining the respective product compartment.

As already mentioned above, the transport device can comprise at least one elongated drive member for the positioners which is movable in the transport direction by means of a drive and to which the positioners are attached. This drive member can in particular serve as a common drive for all positioners. The drive for this drive member can, for example, be integrated into a deflector or into a guide means for the drive member. This preferably takes place in a region of the transport device disposed upstream and remote from the cutting region.

The drive member can, for example, extend beneath the product compartments or to the side next to the product compartments. An optionally provided parallel offset of the drive member with respect to a central axis of the product compartments or of the transported products can generally be selected as any size.

A plurality of drive members can be provided for the or each transport track which are driven or controlled and/or synchronized together and which all extend beneath the product compartments or at both sides next to the product compartments in each case.

All the embodiments of the invention disclosed here which are not explicitly directed to a multi-track transport can generally be used for every transport track, and indeed independently of whether the transport device only has a single transport track or a plurality of transport tracks.

With a plurality of transport tracks, at least two elongated drive members are preferably provided for a respective two directly adjacent transport tracks and extend between the product compartments of these transport tracks. In this respect, the one drive member can be associated with the left transport track and the other drive member can be associated with the right transport track. The two drive members can be arranged either adjacent or combined in a suitable manner, and indeed such that an operation over individual tracks is possible, with respect to an advantageous compact design.

If a respective drive member comprises one or more revolving continuous belts, they are respectively in particular provided in the form of a chain, of a band, of a belt or of a rope. The course of this continuous member can be fixed by two or more deflection members.

As likewise already mentioned above, the elongated drive member can serve exclusively to drive the positioners. The support for the products is then implemented in another manner, for example by a stationary product support via which the products are pushed by means of the positioners then in particular formed as entrainers.

Alternatively, the drive member can, for example, form a lower product support and/or a lateral product contact. If, for example, a revolving chain is used as the drive member, sufficiently wide chain links can be used which are U shaped in cross-section and into which the products can be placed.

A product support "riding along" is in particular of advantage for such products which are not to be pushed, for example for cheese.

If, in contrast, the product support of the transport device is stationary and the products are pushed over this product support by means of the positioners, this has the advantage of a particularly simple design of the transport device. It is a further advantage that a positioning of the rear product end at the respective positioner can automatically be ensured. Such a product transport is particularly well-suited, for example, for ham and for frozen products.

A stationary product support can be of single-track design or multi-track design. A stationary product support can furthermore be configured as areal and so form a "sliding path" for the products so-to-say. Alternatively, the product support can be linear or grid-like and can have one or more elongated support rails for the products which extend in the direction of transport.

Independently of whether a product support is stationary or is moved together with the positioners, the product support can be divided and can have an intermediate space extending in the direction of transport between a left support part and a right support part. With a stationary product support, the positioners can extend through this intermediate space to be coupled, for example, to an elongated drive member extending beneath the product compartments. The support parts can, for example, be formed by two bars or metal sheets extending with a parallel offset from one another. A divided product support can also be of advantage with a non-stationary product support since at least a part of the lower side of the products is accessible. Such an accessibility can in particular be used for a treatment or handling of the products, for example at one of the above-mentioned workstations.

If the transport device comprises a non-stationary product support for the products, provision is preferably made that the product support comprises a plurality of single supports which are movable together with the positioners in the transport device. The individual supports can be respectively divided and can in particular comprise a plurality of individual members for each product compartment. On a use of a revolving continuous system, these members can be deflected for the return path at the front end of the transport line in a relatively tight space.

A loading station which is arranged above the transport device can be provided for loading the transport device. The loading station can be configured such that the transport device automatically removes a respective lower product from the loading station. The loading station can consequently comprise a kind of magazine in which products are arranged above one another in one or more stacks. The removal of products from the loading station can take place directly by the positioners of the transport device. Alternatively, the transport device can trigger a pulse or actuate a switch in an electrical or mechanical manner in order in this manner to trigger the output of a product at the loading station.

The transport device can be provided with a positioning aid in a loading region, said positioning aid providing that a respective product is only entrained by the respective positioner of the transport device and an entrainment of the product is suppressed by it up to this point in time by a product support of the transport device moving in the direction of transport. The positioning aid can, for example, have an elevated stationary support onto which each product is moved and on which the product remains until it is pushed onto the moving product support by the positioner associated with it. A correct positioning of the products at the respective positioner is hereby also automatically ensured on the use of a non-stationary product support.

As already mentioned at another point, a takeover device which takes over products coming from the transport device can be provided between the transport device and the cutting region. The takeover device can be configured to move the products from a transport line into a supply line different from the transport line. The transport line and the supply line can in particular lie in mutually different planes. In this respect, the takeover device can in particular provide for the cycling of the products into the product supply. Whereas the transport line can lead from a loading region up to the product supply or to the takeover device and optionally through one or more workstations, the supply line leads to the cutting plane. The takeover device can consequently represent an interface or a transition between these two lines or regions.

The takeover device can be active either in a respective waiting phase or in a movement phase. The takeover device can, for example, have a rake for removing instantaneously stationary products on the transport device. The takeover device can, however, also be configured such that the products are each pushed from the transport device onto, for example, a downstream product placement area of the takeover device in each case during a movement phase.

With a cyclic operation of the transport device, its cycle is preferably coordinated with the operation of the takeover device. This is advantageous for the case which is important in practice that the so-called "master" function is assigned to the actual cutting function of the slicer and in particular the upstream regions such as the loading, transport and transition into the cutting region or into the product supply directly upstream of the cutting blade have to conform to what is predefined by the cutting operation, i.e. have to satisfy a "slave" function. This division into "master" and "slave" is, however, not compulsory and can also take place differently at least at times. For example, on the movement to the slicer, e.g. on a change of the product type, the transport device can thus have a "master" function for so long until the first products move into the product supply, whereupon the product supply or the actual cutting operation again takes over the "master function".

The takeover device is in particular configured to take the products transported inward to an elevated level from where the products can then be supplied to the cutting blade in the cutting region. The takeover device can therefore in particular provide that the products are brought from an at least substantially horizontal transport plane into a supply plane of the cutting region inclined with respect to the horizontal and required for the slicing and are consequently moved into an elevated oblique position.

The takeover device can be formed by the cutting region, in particular by at least a part region of a product supply of the cutting region. In this respect, the takeover device can comprise a movable, in particular pivotable, product support. One or more product holders or product grippers, with an associated drive in each case, can be arranged at this product support.

The takeover device can be provided in addition to the cutting region or to a product supply of the cutting region and can be configured to transfer the products coming from the transport device to the product supply. The takeover device can e.g. be a separate device such as a gripping and/or lifting device, e.g. in the form of a robot, which represents the transition between the transport device and the cutting region or product supply of the cutting region. The takeover device therefore does not have to be a component of the transport device or of the cutting region and can e.g. be arranged laterally next to the track or tracks to enable the transfer of the products.

The takeover device can be arranged downstream of the transport device, with the products in particular being transferred from the transport device to the takeover device, for example by pushing onto a product support.

Alternatively, the transport device and the takeover device can overlap on another in the direction of transport. The takeover device can in particular be integrated at least partially into the transport device. It is hereby in particular possible for the takeover device to move through the transport device from below and to pick a respective product, for example, by means of a rake.

The transport device can be interrupted in the direction of transport. Alternatively or additionally, an interruption can be provided subsequent to the transport device. A workstation can be arranged in the region of the interruption, in particular to scan the products. Such an interruption makes it possible in a comparatively simple manner, to e.g. install a scanning plane at or at the end of the transport line.

In a method in accordance with the invention for slicing foods, in particular by means of an apparatus as described herein, the products to be sliced are transported in a direction of transport by means of a transport device over one track or multiple tracks to a cutting region at whose end a cutting blade moves, in particular in a rotating and/or revolving manner, in a cutting plane, wherein the transport device comprises, in the or each transport track, a plurality of positioners for the products which are simultaneously driven in the direction of transport and are arranged spaced apart from one another in the direction of transport.

Possible embodiments of the method in accordance with the invention are mentioned in the following and also result from the above statements, from the following Figure description and from the drawings.

The products can be pushed in the direction of transport by means of the positioners during the transport.

The transport device can be operated in a cyclic manner with transport cycles following one another continuously.

The product compartments can be moved by means of the transport device through at least one workstation for the products arranged within the apparatus. The workstation can be operated in coordination with a cycling of the transport device.

In a loading region, the products can automatically be removed by means of the transport device.

In a loading region, an entrainment of a respective product by an individual support of the transport device movable together with the positioners in the transport device can be suppressed up to an entrainment of the product by the respective positioner.

The products coming from the transport device can be taken over by a takeover device. The takeover device can be operated in coordination with a cycling of the transport device.

The products can be raised by means of the takeover device.

The products can be transferred to the takeover device or the products can be removed directly from the transport device by means of the takeover device.

The invention also relates to a method for slicing food products, in particular by means of an apparatus as described herein, in which the products to be sliced are transported over one track or multiple tracks in a direction of transport by means of a transport device to a cutting region at whose end a cutting blade moves, in particular in a rotating and/or revolving manner, in a cutting plane, wherein the transport device is operated in a cyclic manner with transport cycles continuously following one another.

Provision can be made in this respect that the cycling of the transport device is determined by the cutting operation, in particular with respect to waiting phases and/or movement phases for loading the transport device with products and/or for carrying out worksteps at workstations in the region of the transport device.

Products coming from the transport device can be taken over by a takeover device, with the cycling of the transport device being determined by the operation of the takeover device.

At least one workstation can be provided for the products, wherein the transport device moves the product compartments through the workstation and/or with the workstation being temporarily moved along with the product compartments. The operation of the workstation can be determined by the cutting operation and/or by the operation of the takeover device. Alternatively, the operation of the workstation can be determined by the cycling of the transport device.

Provision can furthermore be made that the transport device comprises a plurality of transport tracks, wherein the transport tracks are driven and/or operated independently of one another in the direction of transport.

Figure 2:
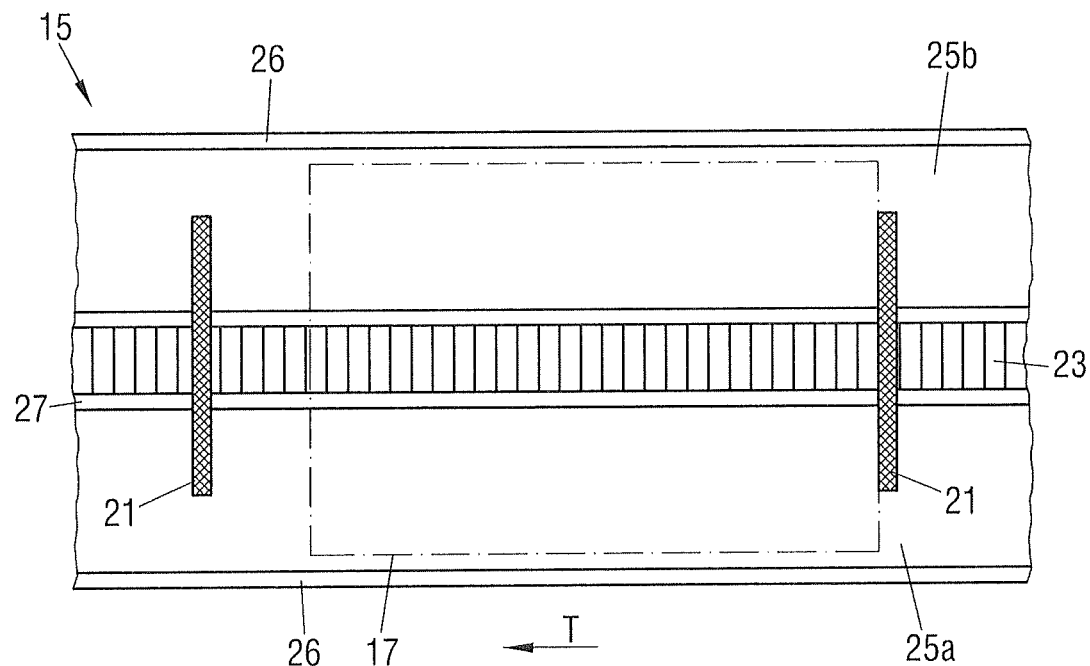
Figure 3:
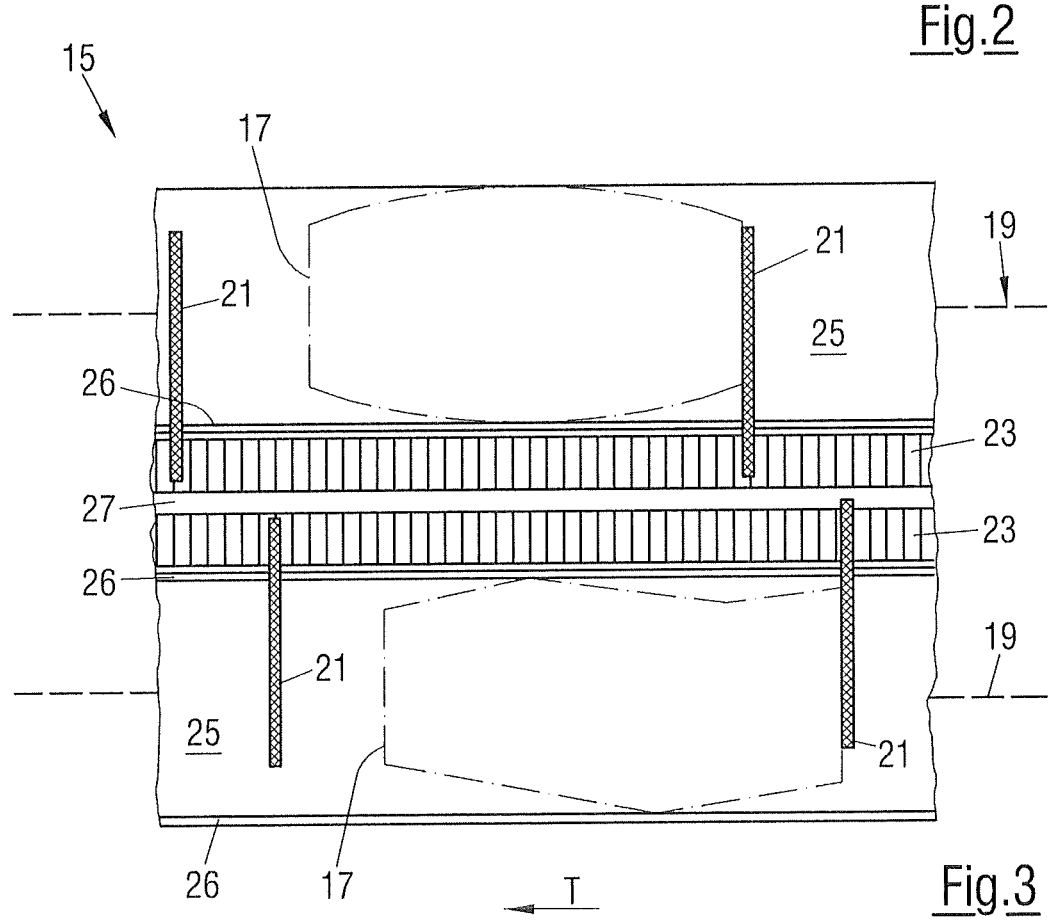
Figure 4:
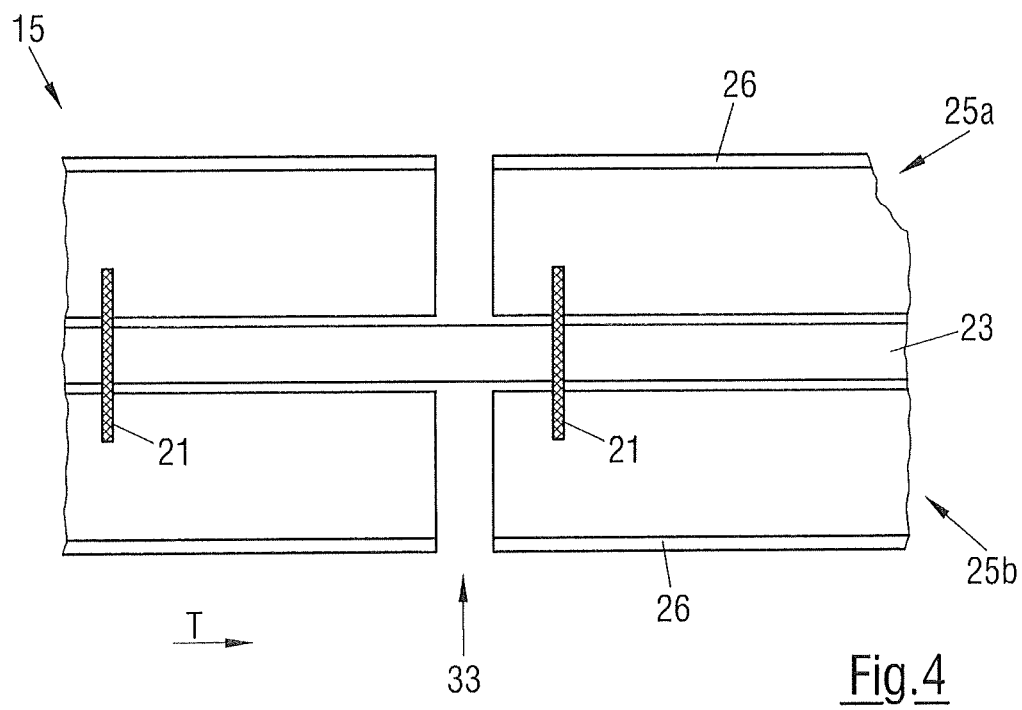
Figure 5:
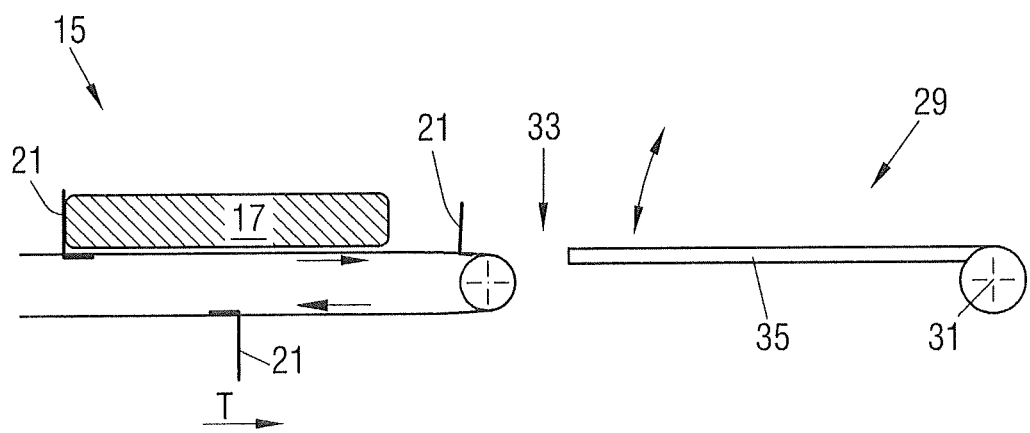
Figure 6:
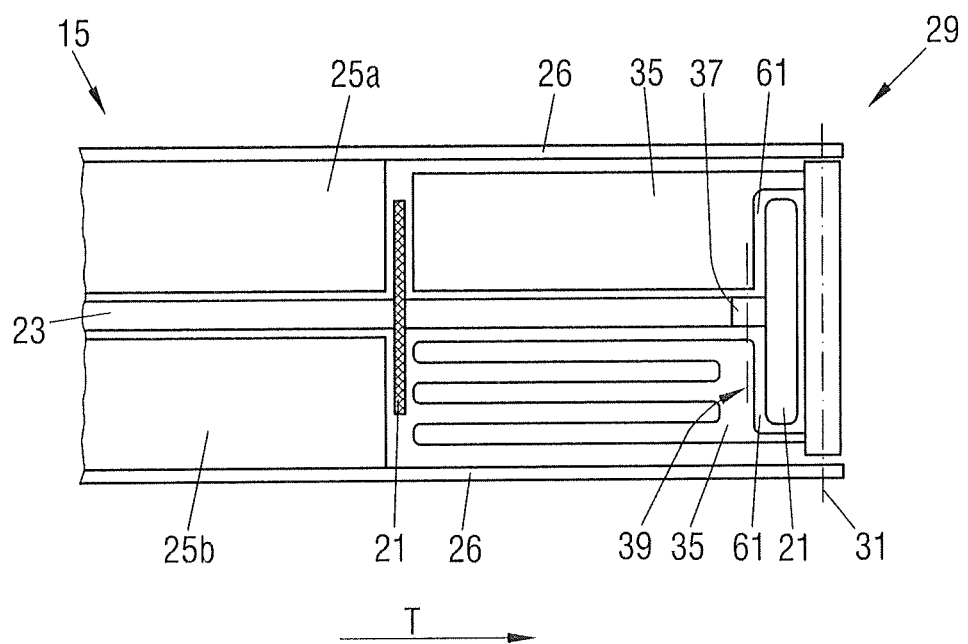

The invention will be described in the following by way of example with reference to the drawing. There are shown:

FIG. 1 schematically in a side view, a possible embodiment of a slicing device in accordance with the invention;

FIG. 2 schematically in a plan view, a detail of a single-track transport device in accordance with the invention;

FIG. 3 schematically in a plan view, a detail of a two-track transport device in accordance with the invention;

FIG. 4 schematically, a plan view of a detail of a transport device in accordance with the invention in accordance with a further embodiment;

FIG. 5 schematically, a side view of a transfer region of a slicing apparatus in accordance with the invention; and FIG. 6 schematically, a plan view of a transfer region in accordance with a further embodiment of a slicing apparatus in accordance with the invention.

The slicing apparatus in accordance with the invention in accordance with FIG. 1 is a high-speed slicer which can slice food products 17 at a high speed which are supplied over multiple tracks to a cutting blade 13 which revolves about an axis 55 in a cutting plane 11 and which is, for example, a so-called scythe-like blade.

Slices 57 cut off by means of the cutting blade 13 fall onto a portioning belt 43 and there form portions 59 which are subsequently transported to a subsequent control belt 45 which further devices, not shown here, typically adjoin such as is explained in the introduction.

The cutting plane 11 forms the end of a cutting region S which comprises a product supply 31 in addition to the cutting blade 13 and to a cutting edge 41 cooperating therewith.

In a preferred embodiment, the product supply 31 is configured completely on an individual track basis and comprises for each track a product gripper 49 cooperating with the rear product end during slicing, a product support 35 which will be explained in more detail in the following and a front product conveyor 53 directly in front of the cutting blade 13. The front product conveyor 53 in particular serves for supporting the product 17 and for controlling the product advance. A drive 51 is provided for the product grippers 49.

The product supply 31, in particular the supports 35 for the individual tracks, form at least a part of a takeover device 29 which takes over products 17 coming from a transport device 15 explained in more detail in the following.

The products 17 are transported inward by means of the transport device 15 in a plane rising slightly with respect to the horizontal and are subsequently brought to a higher level by means of the takeover device 29 and are in so doing moved into an oblique position which is inclined by approximately 40 to 45° with respect to the horizontal and in which the support 35 extends perpendicular to the cutting plane 11.

In the embodiment shown in FIG. 1, the takeover device 29 formed by the support 35 is pivotable about an axis 32 between the shown oblique position and a takeover position indicated by dashed lines in FIG. 1. Possibilities for the interplay between the transport device 15 and the takeover device 29 will be described in more detail at another point.

A machine housing 47 of the slicer is shown by a chain-dotted line in FIG. 1 to illustrate a difference from the prior art. The invention makes it possible to transport the products 17 to be sliced comparatively far into the machine housing 47 by means of the transport device 15 and thus to effect the transfer of the products into the elevated, slanted cutting position within the machine housing 47. An extension of the machine housing 47 to the rear, that is against the direction of transport, is not required for this. The invention rather makes it possible to at least configure the part of the product supply 31 to be pivoted shorter in comparison with the prior art. No construction space or at least comparatively little construction space is hereby required with respect to known slicers in a rear upper region, that is at the top right in the machine housing 47 in FIG. 1, for the pivotable part of the product supply 31 and for the product gripper or grippers 49 together with the drive 51. The construction space thus available can be used for other purposes, for example for workstations A which will be explained in more detail in the following and which are only indicated respectively in FIG. 1 with respect to their position with regard to the direction of transport T.

In the slicers known from the prior art, transport belts for the products 17 extending within the machine housing 47 are pivoted together with the parts of the product supply arranged directly in front of the cutting blade 13. The products are transferred to these transport belt at the input side in the region of the inlet into the machine housing 47. With the known slicers, only the product 17 just to be sliced is thus respectively located within the machine housing 47 and the next product 17 only moves up during the loading. The part of the transport device 15 in accordance with the invention located within the machine housing 47 does not have to be pivoted, in contrast. A plurality of products 17 can thereby always be located on the transport device 15 in the machine housing 47 in accordance with the invention.

In the embodiment of FIG. 1, the transport device 15 comprises a continuous drive member 23 for each transport track which revolves around two deflectors 37 and which is provided, for example, in the form of a chain, of a band, of a belt or of a rope and whose drive preferably takes place via the rear deflector 37.

Positioners 21, which are also called entrainers in the following since they can, for example, also satisfy an entrainment function for the products 17 with a corresponding design of the product support, are attached at even intervals to the drive member 23 which is also simply called a cycle chain in the following with respect to a preferred embodiment and due to a preferred cyclic transport operation explained in more detail in the following. The positioners or entrainers 21 are thus driven together by the cycle chain 23. The spacing between two entrainers 21 directly following one another is larger than the largest expected length of the products 17 to be sliced.

Each section of the transport device 15 between two consecutive entrainers 21 in each track consequently forms a product compartment for exactly one product 17 to be sliced. The entrainers 21 can be adjustable or displaceable in the direction of transport T to be able to adapt the length of the product compartments.

The transport device 15 furthermore comprises a product support 25 which is not shown in detail and which can be stationary such that the products 17 on the product support 25 are pushed in the direction of transport T by means of the entrainers 21 to the cutting region S. The entrainers 21 in this respect therefore respectively cooperate with the rear product end. An unambiguously defined positioning of the products 17 is hereby automatically ensured. The position of each product 17 with respect to the cycle chain 23 and thus within the slicing apparatus is known to a central control device which is not shown and which inter alia controls the drive of the cycle chain 23 in each transport track 19.

As already explained in the introduction, the transport region takes place in a cyclic manner such that a relatively short waiting phase with stationary entrainers 21 is subsequent to a comparatively long movement phase in which the products 17 are conveyed in the direction of transport T to the cutting region S.

The cycling can be selected differently for the individual transport tracks 19 of the transport device 15, of the adjoining takeover device 29 and of the product supply 31 such that a handling of the products 17 can take place in a manner completely individual per track from the loading region B up to the common cutting blade 13, that is over the total supply side of the slicer. Such an operation of the slicer individual to each track at the supply side is, however, not compulsory.

The different functional regions of the slicer can each be coordinated with respect to its operation for each transport track 19 with regard to its cycling. The roles of "master" and "slave" can, however, also be distributed differently, as explained at another point.

The functional regions in particular comprise the loading region B disposed in front of the machine housing 47, one or more workstations A disposed within the machine housing 47, a transfer region between the end of the transport device 15 and the cutting region S, that is in particular the takeover device 29, and the cutting region S.

The loading of the transport device 15 with products 17 can e.g. take place manually at the loading region B. A product magazine 63 can, however, also be provided—as indicated in FIG. 1—which allows an automatic loading of the transport device 15 or an automatic removal of products 17 by means of the transport device 15.

The devices disposed downstream of the cutting blade 13 such as in particular the portioning belt 43 and the control belt 45 adjoining it can also be designed with multiple tracks and can be operable over individual tracks. This is also not compulsory.

The "degree" to which the slicer in accordance with the invention is operable over multiple tracks and over individual tracks overall can be made dependent on the application or applications for which the slicer is primarily designed.

The workstations A are, for example, a scale which works during a waiting phase with stationary products 17 as well as a product scanner which determines, with a respective product 17 moving in the direction of transport T, its outer contour and/or inner structure such as is generally known per se from the prior art.

As regards the mentioned scale at one of the workstations A, it can, for example, be configured to raise a product 17 to be weighed temporarily from the product support 25 of the respective transport track 19. The scale can be provided with a rake for this purpose. In this respect, the cycle chain 23 can be moved for a comparatively small way along the direction of transport T in order in this manner to provide a free space between the rear product end and the respective entrainer 21. Additionally or alternatively, the product 17 can be raised a little in the region of the scale and can thus be decoupled from the product support 25.

Alternatively or additionally, a weighing function can be integrated into the takeover device 29. The pivot procedure can, for example, be used for the weighing, e.g. by detecting and evaluating the drive current in this respect.

FIG. 2 shows a plan view of a single-track transport device 15. Entrainers 21 are attached at regular intervals to the continuously revolving cycle chain 23. The products 17 to be transported, of which only one is shown in FIG. 2 by a chain-dotted line and which each contact the respective entrainer 21 at their rear product ends lie on a stationary product support 25 which comprises, viewed in the direction of transport T, a left support part 25a and a right support part 25b. The product support 25 is therefore centrally divided and is provided with a central intermediate space 27 through which the entrainers 21 can extend for coupling to the cycle chain 23.

The two support parts 25a, 25b are here provided in the form of angled sheets, for example of stainless steel or plastic. The products 17 each lie on the support sections forming a common plane and defining the intermediate space 27 and are guided or prevented from a lateral breaking out by side walls 26 standing perpendicular to these sections.

In the movement phases during the cyclic transport operation, the products 17 are consequently pushed over the support sections of the stationary product support parts 25a, 25b by means of the entrainers 21 respectively engaging at the rear product end. The cycle chain 23 in this respect extends beneath the support plane for the products 17 formed by the support parts 25a, 25b so that the products 17 do not come into contact with the cycle chain 23.

The size and the shape of the entrainers 21 can be adapted to the respective product type. For example, the entrainers 21 can be provided with a concave abutment surface to be able to ideally act on correspondingly shaped product ends.

The entrainers 21 can furthermore be releasably fastened to the cycle chain 23 to be able to replaced or displaced easily for cleaning purposes or for a change of the product type.

In the embodiment of FIG. 2, the entrainers 21 do not reach up to the side walls 26. This is alternatively possible. Provision can be made in this respect that the entrainers 21 are guided by the side walls 26. The positioning accuracy of the products 17 in the transport device 15 can hereby be further increased.

A transport chain 23 extending centrally with respect to the respective transport track 19 is only one of a plurality of possibilities in accordance with the invention. In an alternative embodiment, the transport chain 23 can also extend laterally next to the product compartments. This is possible both for single-track and multi-track transport devices 15.

Laterally extending cycle chains 23 can particularly advantageously be used when, in accordance with the embodiment of FIG. 3, the transport device 15 has a pair (or alternatively a plurality of pairs) of transport tracks 19 extending directly next to one another. In this respect, two cycle chains 23 which extend directly next to one another and which can preferably be driven independently of one another are arranged centrally between two respectively stationary product supports 25 via which the products 17 are each pushed by means of respective entrainers 21 which project laterally outwardly and which are fastened to the respective transport chain 23.

Two possible variants for the embodiment of the product supports 25 are shown in FIG. 3. No side wall is provided at the outside in the upper transport track 19 at the right in the direction of transport T, i.e. the product support 25 is laterally open in this transport track 19. The products 17 are consequently easily accessible, which can be used for example, for a scanning of the products 17 in one of the workstations A (cf. FIG. 1).

Such an open configuration is, however, not compulsory. It is shown for the example of the lower transport track 19 in FIG. 3 which is at the left in the direction of transport T that the product support 25 can be outwardly provided with a side wall 26 in accordance with the embodiment of FIG. 2.

The product supports 25 are respectively provided with a side wall 26 inwardly, i.e. toward the intermediate space 27 which is present between the support sections of the product supports 25 and through which the entrainers 21 can extend for coupling to the respective cycle chain 23.

FIG. 4 shows a possibility for how a transport track 19 of a single-track or multi-track transport device 15 can be configured in the region of one of the workstations A (cf. FIG. 1) in order to scan a respective moving product 17 at this workstation A in the movement phases of the cyclic transport operation.

The product support configured in accordance with the embodiment of FIG. 2, i.e. the two support parts 25a, 25b are interrupted to form a gap 33 in the direction of transport T. The gap 33 allows an access to the products both from the side and from below without impairing a secure support of the products. In this manner, the products can be illuminated by a scanner forming the respective workstation and e.g. working in accordance with the light sectioning process in a scanning plane extending through the gap 33 and can be detected by means of cameras. An impairment of the "free view" of the lower side of the products 17 by the cycle chain 23 can be neglected or can be considered in the evaluation of the scanning data, e.g. by predefined values.

While the product scanning station is integrated in the transport line in the embodiment of FIG. 4, FIG. 5 shows another possibility for the integration of a scanning device in the apparatus in accordance with the invention.

In FIG. 5, the transition is shown between the end of the transport device 15 at the front in the direction of transport T and a takeover device 29 which has a support 35 which is pivotable about an axis 31 to move the products to be transported inward into an oblique position for the slicing procedure (cf. FIG. 1).

The takeover device 29 is disposed downstream of the transport device 15 here. The products 17 are each pushed onto the pivotable support 35 by means of the entrainers 21. A gap 33 is provided between the front end of the transport device 15 and the support 35 in the direction of transport T and allows the products 17 to be scanned in each case during their transfer to the support 35 from all sides, for example in a plane extending perpendicular to the direction of transport T through the gap 33.

FIG. 6 shows an alternative possibility for the cooperation of the transport device 15 and the takeover device 29 for taking over products 17. As in FIG. 5, a support 35 pivotable about an axis 31 is shown of the takeover device 29. In this respect, FIG. 6 simultaneously illustrates two possible variants for the design of the support 35. The support 35 is formed as a continuous plate on the side of the cycle chain 23 which is at the left in the direction of transport T and which is in turn arranged centrally in this transport track 19. The support 35 is in contrast formed by a rake at the right side.

The different design of the support 35 made in FIG. 6 only serves—as said and as made with respect to the side walls 26 in FIG. 3—for the illustration of the different possibilities. Such a design is admittedly possible in practice, with the support 35, however, preferably having the same design at both sides of the cycle chain 23 in practice.

The products transported inward by means of the entrainers 21 are respectively pushed both onto a support 35 of plate form and onto a support 35 formed in the manner of a rake. The products pushed on can then be moved into the oblique position by pivoting the support 35.

Whereas the takeover device 29 is disposed downstream of the transport device 15 in the embodiment of FIG. 5, the transport device 15 and the takeover device 29 are here arranged overlapping one another or integrated into one another in the direction of transport T. The products 17 are consequently raised out of the transport device 15 by means of the pivotable support 35.

Such a raising concept allows a particularly compact implementation of a transfer system for the products 17 which saves space in the direction of transport T.

To allow the "dipping" of the entrainers 21 fastened to the continuously revolving cycle chain 23 at the end of the cycle chain 23 at the front in the direction of transport T, the cycle chain being deflected around a deflector 37 defining an axis 39 there, the support 35 of the takeover device 29 is provided with correspondingly shaped cut-outs 61.

The product support 25 is in each case areal in the embodiments explained above, i.e. the support sections of the metal plates each form a wide sliding path or pushing path for the products 17. The support for the products 17 can alternatively be linear or strip-shaped. The products 17 can, for example, lie on rods, bars or comparatively narrow profiles. Depending on the size and consistency of the products 17, two such slide rails may be sufficient which, for example, each extend at one side of the cycle chain 23 with a central arrangement of the cycle chain 23 in accordance with FIG. 2 and extend in parallel with one another next to the cycle chain 23 with a lateral arrangement of the cycle chain 23 in accordance with FIG. 3 for each of the transport tracks 19 instead of the areal support section.

As already mentioned at another point, a support for the products 17 can be provided which moves in the direction of transport T together with the products 17 instead of a stationary product support 25 via which the products 17 are pushed.

Such a product support which "rides along" can, for example, be formed by a plurality of continuous members such as a chain, a band, a belt or a rope which extend in parallel with one another and which are driven together. For example, two toothed belts which extend spaced apart from one another in parallel can together serve as a product support 25 which simultaneously provides for the advance of the products 17. These drive members can be adjustable with respect to their lateral spacing to adapt to different product types.

Such continuously revolving drive members then together respectively form a cycle chain in the sense of the invention. The entrainers for the products 17 can be provided in the form of outwardly projecting abutment elements which are fastened to at least one of the drive members.

Instead of such a plurality of individual drive members for forming a cycle chain in accordance with the invention, a single continuously revolving drive member can be so wide that the products can lie on this cycle chain. The entrainers can then in turn be provided in the form of outwardly projecting abutment elements. Such a cycle chain can comprise a plurality of chain links which are each of U shape in cross-section, which are comparatively short in the direction of transport T, which are e.g. of strip shape or plate shape and which thus simultaneously form a support and a lateral guidance for the products.

A further advantage of the transport concept in accordance with the invention comprises an entrainment of the products 17 by entrainers 21 engaging at the rear product end without impairing the positional accuracy enabling the overcoming of gradients such as is shown in FIG. 1 by the transport device 15 rising a comparatively little in the direction of transport T. The loading level can hereby be comparatively low in the loading region B to be able to facilitate a manual placement of products for the operator or to be able to design a loading aid or an automatic loading system more simply, but with the products 17 already being able to be brought to a comparatively high level within the machine housing 47 by means of the transport device 15, which in turn facilitates the moving of the products 17 into the desired oblique position in the cutting region S in a construction regard and with respect to the space requirement necessary for this.

REFERENCE NUMERAL LIST 11 cutting plane
13 cutting blade
15 transport device
17 product
19 transport track
21 positioner
23 drive member
25 product support
25a support part
25b support part
26 side wall
27 intermediate space
29 takeover device
31 product supply
32 axis
33 gap
35 support of the takeover device
37 deflector
39 axis
41 cutting edge
43 portioning belt
45 control belt
47 machine housing
49 product holder, product gripper
51 drive
53 product conveyor
55 axis
57 slice
59 portion
61 cut-out
63 product magazine
S cutting region
T direction of transport
A workstation
B loading region

The invention claimed is:

1. An apparatus for slicing food products,
having a cutting region at whose end a cutting blade moves in a cutting plane; and
having a transport device which transports products to be sliced in a direction of transport to the cutting region over one track or a plurality of tracks to the cutting region or to a takeover device being configured to take over the products from the transport device and to transport the products to the cutting region,
wherein the transport device in the or each transport track comprises a plurality of positioners for the products simultaneously driven in the direction of transport and arranged spaced apart from one another in the direction of transport,
wherein the transport device is configured for a cyclic transport operation with continuously consecutive transport cycles,
wherein the transport cycles respectively comprise a movement phase with product compartments moving in the direction of transport and a waiting phase with stationary product compartments,
wherein at least one workstation for the products is arranged within the apparatus, with the transport device moving product compartments through the at least one workstation or with the at least one workstation being temporarily movable along with product compartments, wherein each of the product compartments is a section of the transport device which is provided for a single product and which is associated with one of the positioners,
wherein the operation of the at least one workstation is coordinated with the cyclic transport operation cycle of the transport device,
wherein at least one of the transport device and the at least one workstation is configured respectively to temporarily raise the products in the region of the at least one workstation, to bring them out of engagement with the positioner and/or to space them apart from the positioner.

2. The apparatus in accordance with claim 1,
wherein the positioners each form or define a rear end of a product compartment.

3. The apparatus in accordance with claim 1,
wherein the positioners each form or comprise an entrainer which is configured to entrain the product during a transport.

4. The apparatus in accordance with claim 1,
wherein the positioners are evenly spaced apart in the direction of transport.

5. The apparatus in accordance with claim 1,
wherein the positioners are spaced apart in the direction of transport at a spacing and the spacing is unchangeable during a transport operation.

6. The apparatus in accordance with claim 1,
wherein the transport device comprises a plurality of transport tracks, with at least two transport tracks differing from one another with respect to the spacing of the positioners.

7. The apparatus in accordance with claim 1,
wherein the transport device comprises a plurality of transport tracks, with the transport tracks being able to be driven independently of one another in the direction of transport.

8. The apparatus in accordance with claim 1,
wherein the transport device is configured for cyclic transport movements, with in each case the product being raised in the transport cycles, a forward movement with the product being carried out, the product being lowered, and a rearward movement without a product being carried out.

9. The apparatus in accordance with claim 1,
wherein the transport device for the positioners comprises at least one elongated drive member which is movable in the direction of transport by means of a drive and at which the positioners are attached.

10. The apparatus in accordance with claim 9,
wherein the positioners each form or define a rear end of a product compartment and wherein the elongated drive member extends beneath the product compartments.

11. The apparatus in accordance with claim 9,
wherein the positioners each form or define a rear end of a product compartment and wherein the elongated drive member extends laterally next to the product compartments.

12. The apparatus in accordance with claim 9,
wherein a plurality of elongated drive members are provided for the or each transport track.

13. The apparatus in accordance with claim 9,
wherein the positioners each form or define a rear end of a product compartment and wherein the transport device comprises a plurality of transport tracks, with at least two elongated drive members respectively being provided for two directly adjacent transport tracks and extending between the product compartments of these transport tracks.

14. The apparatus in accordance with claim 9, wherein the drive member comprises at least one revolving endless member.

15. The apparatus in accordance with claim 9, wherein the positioners each form or define a rear end of a product compartment and wherein the product compartments are at least partly formed and/or bounded by the elongated drive member.

16. The apparatus in accordance with claim 1, wherein the transport device comprises a product support on which the products lie during the transport operation.

17. The apparatus in accordance with claim 16, wherein the product support is stationary.

18. The apparatus in accordance with claim 16, wherein the product support is divided and an intermediate space is present between a left support part and a right support part and extends in the direction of transport.

19. The apparatus in accordance with claim 16, wherein the product support comprises a plurality of individual supports which are movable in the direction of transport together with the positioners.

20. The apparatus in accordance with claim 1, wherein a loading station is arranged above the transport device.

21. The apparatus in accordance with claim 1, wherein the transport device is provided with a positioning aid in a loading region, said positioning aid suppressing an entrainment of a respective product by a single support up to the entrainment of the product by the respective positioner.

22. An apparatus for slicing food products, having a cutting region at whose end a cutting blade moves in a cutting plane; and
having a transport device which transports products to be sliced in a direction of transport over one track or a plurality of tracks to a takeover device being configured to take over the products from the transport device and to transport the products to the cutting region; and
wherein the takeover device is shorter than the transport device when viewed in the direction of transport,
wherein the transport device in the or each transport track comprises a plurality of positioners for the products simultaneously driven in the direction of transport and arranged spaced apart from one another in the direction of transport,
wherein the transport device is configured for a cyclic transport operation with continuously consecutive transport cycles,
wherein the cyclic transport operation of the transport device is coordinated with the operation of the takeover device,
wherein the transport cycles respectively comprise a movement phase with product compartments moving in the direction of transport and a waiting phase with stationary product compartments, each of the product compartments being a section of the transport device which is provided for a single product and which is associated with one of the positioners,
wherein the takeover device is configured to raise or to lift the products, that have been taken over from the transport device, for transporting the products to the cutting region.

23. The apparatus in accordance with claim 22, wherein the takeover device is formed by a product supply of the cutting region; or wherein the takeover device is provided in addition to a product supply of the cutting region and is configured to transfer the products coming from the transport device to the product supply.

24. The apparatus in accordance with claim 22, wherein the takeover device is disposed downstream of the transport device and the transport device is configured to transfer the products to the takeover device.

25. The apparatus in accordance with claim 22, wherein the takeover device is configured to remove the products directly from the transport device.

26. The apparatus in accordance with claim 22, wherein the transport device and the takeover device overlap one another in the direction of transport.

27. The apparatus in accordance with claim 1, wherein the transport device is interrupted in the direction of transport; and/or wherein an interruption is provided subsequent to the transport device, with a workstation being arranged in the region of the interruption.

28. A method for slicing food products:
in which the products to be sliced are transported in a direction of transport over one track or multiple tracks by means of a transport device to a cutting region at whose end a cutting blade moves or to a takeover device being configured to take over the products from the transport device and to transport the products to the cutting region,
wherein the transport device in the or each transport track comprises a plurality of positioners for the products simultaneously driven in the direction of transport and arranged spaced apart from one another in the direction of transport, the method further comprising the steps of:
loading the products onto the transport device to associate each product with one of the positioners;
positioning each product with the respective positioner, thereby defining the position of each product on the transport device with respect to a direction of transport defined by the transport device,
transporting the so positioned products to the cutting region or to the takeover device being configured to take over the products from the transport device and to transport the products to the cutting region, and
slicing the so transported products with the cutting blade.

29. A method for slicing food products comprising
operating a transport device in a cyclic manner to provide waiting phases of the transport device and movement phases of the transport device;
loading the products onto the transport device, each product being loaded onto the transport device either during a waiting phase or during a movement phase;
transporting, in said cyclic manner with said waiting phases and movement phases, the products in a direction of transport over at least one track to a cutting region or to a takeover device being configured to take over the products from the transport device and to transport the products to the cutting region; and
slicing the transported products with a cutting blade.

30. The method in accordance with claim 29, wherein the cycling of the transport device is determined by the cutting operation.

31. The method in accordance with claim 29,
wherein products coming from the transport device can be taken over by a takeover device, with the cycling of the transport device being determined by the operation of the takeover device.

32. The method in accordance with claim 29,
wherein at least one workstation is provided for the products; with the transport device moving product compartments through the at least one workstation; and/or with the at least one workstation being temporarily moved along with product compartments; and with the operation of the at least one workstation being determined by the cutting operation and/or by the operation of a takeover device.

33. The method in accordance with claim 29,
wherein at least one workstation is provided for the products; with the transport device moving product compartments through the at least one workstation (A); and/or with the at least one workstation being temporarily moved along with product compartments; and with the operation of the at least one workstation being determined by the cycling of a takeover device.

34. The method in accordance with claim 29,
wherein the transport device comprises a plurality of transport tracks, with the transport tracks being driven and/or operated independently of one another in the direction of transport.

* * * * *